(12) United States Patent
Agapiou et al.

(10) Patent No.: US 9,903,177 B2
(45) Date of Patent: *Feb. 27, 2018

(54) SETTABLE COMPOSITIONS AND METHODS OF USE

(71) Applicant: Halliburton Energy Services, Inc., Houston, TX (US)

(72) Inventors: Kyriacos Agapiou, Houston, TX (US); Juan Humberto Martinez, Houston, TX (US); Thomas Jason Pisklak, Cypress, TX (US); Vivek S. Goel, Humble, TX (US); Lance Everett Brothers, Chockasha, OK (US); Benjamin John Iverson, Zionsville, IN (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/362,397

(22) Filed: Nov. 28, 2016

(65) Prior Publication Data
US 2017/0073273 A1 Mar. 16, 2017

Related U.S. Application Data

(63) Continuation of application No. 14/194,125, filed on Feb. 28, 2014, now Pat. No. 9,534,165, which is a
(Continued)

(51) Int. Cl.
*E21B 33/13* (2006.01)
*E21B 33/14* (2006.01)
(Continued)

(52) U.S. Cl.
CPC ............ *E21B 33/13* (2013.01); *C04B 22/147* (2013.01); *C04B 22/16* (2013.01); *C04B 28/18* (2013.01);
(Continued)

(58) Field of Classification Search
None
See application file for complete search history.

(56) References Cited

U.S. PATENT DOCUMENTS

| | | | | | |
|---|---|---|---|---|---|
| 2,411,793 | A | * | 11/1946 | Kennedy | C09K 8/50 106/205.01 |
| 2,848,051 | A | * | 8/1958 | Williams | C09K 8/42 166/291 |

(Continued)

FOREIGN PATENT DOCUMENTS

| | | |
|---|---|---|
| CA | 2866602 | 9/2013 |
| WO | 1996020899 | 7/1996 |
| WO | 2015034477 | 3/2015 |

OTHER PUBLICATIONS

How Microsilica Improves Concrete, Publication #C850327. Copyright 1985, The Aberdeen Group.
(Continued)

*Primary Examiner* — Anuradha Ahuja
(74) *Attorney, Agent, or Firm* — Craig W. Roddy; Tumey L.L.P.

(57) ABSTRACT

Disclosed herein are settable compositions and methods of using settable compositions in a wellbore. In one embodiment a method of introducing a settable composition into a wellbore is described. The method comprises providing a settable composition comprising pumice, hydrated lime, a set retarder, and water. Introducing the settable composition into a wellbore. Allowing the settable composition to remain static in the wellbore, wherein the settable composition remains in a pumpable fluid state for a period of about 1 day or longer while static in the wellbore.

20 Claims, 5 Drawing Sheets

Related U.S. Application Data continuation-in-part of application No. 13/417,001, filed on Mar. 9, 2012, now Pat. No. 8,851,173.

(51) Int. Cl.
| | |
|---|---|
| *C09K 8/467* | (2006.01) |
| *C04B 28/18* | (2006.01) |
| *C04B 40/06* | (2006.01) |
| *C04B 22/14* | (2006.01) |
| *C04B 22/16* | (2006.01) |

(52) U.S. Cl.
CPC .......... *C04B 40/0658* (2013.01); *C09K 8/467* (2013.01); *E21B 33/14* (2013.01); *C09K 2208/10* (2013.01); *Y02W 30/94* (2015.05)

(56) References Cited

U.S. PATENT DOCUMENTS

| | | | |
|---|---|---|---|
| 3,238,279 A | 3/1966 | Tarlton | |
| 3,557,876 A | 1/1971 | Tragesser | |
| 3,887,009 A | 6/1975 | Miller et al. | |
| 3,959,003 A | 5/1976 | Ostroot et al. | |
| 4,054,462 A * | 10/1977 | Stude | C04B 28/14 |
| | | | 106/717 |
| 4,462,837 A * | 7/1984 | Baker | C04B 24/383 |
| | | | 106/720 |
| 4,515,216 A | 5/1985 | Childs et al. | |
| 4,519,452 A | 5/1985 | Tsao et al. | |
| 4,524,828 A | 6/1985 | Sabins et al. | |
| 4,676,832 A | 6/1987 | Childs et al. | |
| 4,818,288 A | 4/1989 | Aignesberger et al. | |
| 5,058,679 A | 10/1991 | Hale et al. | |
| 5,263,542 A | 11/1993 | Brothers | |
| 5,447,197 A | 9/1995 | Rae et al. | |
| 5,547,506 A | 8/1996 | Rae et al. | |
| 6,173,778 B1 | 1/2001 | Rae et al. | |
| 6,279,655 B1 | 8/2001 | Pafitis et al. | |
| 6,457,523 B1 | 10/2002 | Vijn et al. | |
| 6,524,384 B2 | 2/2003 | Griffith et al. | |
| 6,610,140 B2 | 8/2003 | Vijn et al. | |
| 6,716,282 B2 | 4/2004 | Griffith et al. | |
| 6,907,928 B2 | 6/2005 | Di Lullo Arias et al. | |
| 6,908,508 B2 | 6/2005 | Brothers | |
| 7,086,466 B2 | 8/2006 | Roddy et al. | |
| 7,150,321 B2 | 12/2006 | Luke et al. | |
| 7,199,086 B1 | 4/2007 | Roddy et al. | |
| 7,201,798 B2 | 4/2007 | Brothers et al. | |
| 7,338,923 B2 | 3/2008 | Roddy et al. | |
| 7,478,675 B2 | 1/2009 | Roddy et al. | |
| 7,559,369 B2 | 7/2009 | Roddy et al. | |
| 7,575,055 B2 | 8/2009 | Reddy et al. | |
| 7,617,870 B1 | 11/2009 | Roddy et al. | |
| 7,670,427 B2 | 3/2010 | Perez-Pena | |
| 7,674,332 B2 | 3/2010 | Roddy et al. | |
| 7,743,828 B2 | 6/2010 | Roddy et al. | |
| 7,757,765 B2 | 7/2010 | Hilleary et al. | |
| 7,784,542 B2 | 8/2010 | Roddy et al. | |
| 7,789,150 B2 | 9/2010 | Roddy et al. | |
| 7,806,183 B2 | 10/2010 | Roddy et al. | |
| 7,836,954 B2 | 11/2010 | Morgan et al. | |
| 7,855,170 B2 | 12/2010 | Perera et al. | |
| 7,863,224 B2 | 1/2011 | Keys et al. | |
| 7,867,954 B2 | 1/2011 | Warrender et al. | |
| 7,892,352 B2 | 2/2011 | Roddy et al. | |
| 7,964,538 B2 | 6/2011 | Perera et al. | |
| 8,038,790 B1 | 10/2011 | Dubey et al. | |
| 8,048,828 B2 | 11/2011 | Deville | |
| 8,048,829 B2 | 11/2011 | Deville | |
| 8,183,186 B2 | 5/2012 | Luo | |
| 8,281,859 B2 | 10/2012 | Roddy et al. | |
| 8,297,357 B2 | 10/2012 | Brenneis et al. | |
| 8,307,899 B2 | 11/2012 | Brenneis et al. | |
| 8,403,045 B2 | 3/2013 | Brenneis et al. | |
| 8,476,203 B2 | 7/2013 | Patil | |
| 8,851,173 B2 * | 10/2014 | Brothers | C04B 28/18 |
| | | | 106/792 |
| 9,227,872 B2 * | 1/2016 | Pisklak | C09K 8/428 |
| 9,260,343 B2 * | 2/2016 | Brothers | C04B 16/00 |
| 9,328,281 B2 * | 5/2016 | Agapiou | C04B 28/18 |
| 9,328,583 B2 | 5/2016 | Pisklak | |
| 9,371,712 B2 * | 6/2016 | Boul | C04B 28/18 |
| 9,580,638 B2 * | 2/2017 | Boul | C04B 28/18 |
| 2002/0050232 A1 * | 5/2002 | Yamashita | C04B 24/2647 |
| | | | 106/802 |
| 2004/0127606 A1 * | 7/2004 | Goodwin | C04B 24/163 |
| | | | 524/2 |
| 2004/0211342 A1 | 10/2004 | Sprouts et al. | |
| 2006/0041060 A1 * | 2/2006 | George | C04B 24/161 |
| | | | 525/56 |
| 2006/0054320 A1 * | 3/2006 | Brothers | C04B 28/02 |
| | | | 166/292 |
| 2006/0166834 A1 | 7/2006 | Roddy et al. | |
| 2007/0089643 A1 * | 4/2007 | Roddy | C04B 28/06 |
| | | | 106/692 |
| 2007/0102157 A1 | 5/2007 | Roddy et al. | |
| 2007/0125534 A1 * | 6/2007 | Reddy | C04B 28/06 |
| | | | 166/277 |
| 2009/0020044 A1 * | 1/2009 | Constantz | C04B 14/26 |
| | | | 106/738 |
| 2009/0038800 A1 * | 2/2009 | Ravi | C04B 28/02 |
| | | | 166/292 |
| 2009/0124522 A1 | 5/2009 | Roddy et al. | |
| 2010/0016183 A1 | 1/2010 | Roddy et al. | |
| 2010/0025039 A1 | 2/2010 | Roddy et al. | |
| 2010/0044043 A1 * | 2/2010 | Roddy | C04B 28/021 |
| | | | 166/294 |
| 2010/0273912 A1 | 10/2010 | Roddy et al. | |
| 2010/0282466 A1 * | 11/2010 | Brenneis | C04B 28/021 |
| | | | 166/293 |
| 2010/0292365 A1 | 11/2010 | Roddy | |
| 2011/0017452 A1 * | 1/2011 | Benkley | C04B 28/021 |
| | | | 166/292 |
| 2011/0132605 A1 | 6/2011 | Sarap et al. | |
| 2011/0162845 A1 | 7/2011 | Ravi | |
| 2011/0305830 A1 * | 12/2011 | Frantz | C04B 28/001 |
| | | | 427/230 |
| 2012/0018155 A1 * | 1/2012 | Patil | C04B 28/04 |
| | | | 166/293 |
| 2012/0167803 A1 | 7/2012 | Luo | |
| 2012/0186494 A1 | 7/2012 | Roddy | |
| 2012/0190769 A1 | 7/2012 | Patil | |
| 2012/0192768 A1 | 8/2012 | Ravi | |
| 2012/0211227 A1 | 8/2012 | Thaemlitz | |
| 2013/0233550 A1 | 9/2013 | Brothers et al. | |
| 2013/0248183 A1 | 9/2013 | Pisklak et al. | |
| 2014/0000893 A1 | 1/2014 | Lewis et al. | |
| 2014/0020895 A1 | 1/2014 | Agapiou et al. | |
| 2014/0034313 A1 | 2/2014 | Pisklak et al. | |
| 2014/0034314 A1 | 2/2014 | Lewis et al. | |
| 2014/0048267 A1 | 2/2014 | Pisklak et al. | |
| 2014/0190696 A1 | 7/2014 | Iverson | |

OTHER PUBLICATIONS

Non-final Rejection for U.S. Appl. No. 15/087,961 dated Apr. 17, 2017.

Benge et al., "Deep Gas-Well Cementation: A Review of Risks and Design Basis for Use of a Liquid Cement Premix for Large Offshore Cementing Operations", IADC/SPE 98970, pp. 1-5, IADC/SPE Drilling Conference, 2006.

Rae et al., "Liquid Cement Premix Introduces New Solutions to Conventional Cementing Problems", IADC/SPE 35086, pp. 393-400, IADC/SPE Drilling Conference, 1996.

Rae et al., "Liquid Cement Premix for Improved Abandonment and Workover Operations", SPE 36477, pp. 637-643, SPE, Inc., 1996.

Anderson et al., "New Technology Eliminates Bulking in Cementing Operations", SPE 36478, pp. 645-653, SPE, Inc., 1996.

Anderson et al., "New Technology Improves Cement Slurry Design", SPE 36973, pp. 127-136, SPE, Inc., 1996.

(56) References Cited

OTHER PUBLICATIONS

Shaefer et al., "Utilizing 'Over-Seas' Technology Improves the Cementing Processes in the DJ Basin of Colorado", SPE 80940, pp. 1-8, SPE, Inc., 2003.
"Liquid Stone® Cement Technology", Product Sales Bulletin, BJ Services Company, pp. 1-2, Oct. 19, 2004.
HES brochure "Micro Matrix® Cement Retarder", H01481, Aug. 2007.
HES brochure "CFR-3™ Cement Friction Reducer", H01325, Oct. 2005.
Hess Pumice Products, Inc., "Fact Sheet", located at website www.hesspumice.com, printed from Internet Mar. 2012.
PCT Search Report for PCT International Application No. PCT/US2013/029489 dated Apr. 19, 2013.
PCT Written Opinion for PCT International Application No. PCT/US2013/029489 dated Apr. 19, 2013.
"Conduction Calorimetric Investigation of the effect of Retarders on the Hydration of Portland Cement", V.S. Ramachandran and M.S. Lowery—Thermochimica Arts, 195 (1992) 373-387.
"Competitive Adsorption of Phosphate and Phosphonates onto Goethite", Bernd Nowack and Alan T. Stone—Water Research 40 (2006) 2201-2209.
"Molecular Modeling of the Mechanism of Action of Phosphonate Retarders on Hydrating Cements", Peter V. Coveney and William Humphries—J. Chem. Soc., Faraday Trans., 1996, 92(5, 831-841).
Yana, Y. et al., (1996). "Growth and Engineering of Microporous Zeolite Films and Coatings." MRS Proceedings, 431, p. 211.
Malvern Brochure "Zetasizer Nano ZS" dated 2011.
Nissan Chemical Brochure "Snowtex®" dated 2007.
ThermPhos Brochure "Dequest® 2006" printed from the Internet on Mar. 25, 2013.
OFI Testing Equipment, Inc. Brochure "Ultrasonic Cement Analyzer" dated 2013.
Hess Brochure "Pumice Pozz for Well Cements" dated 2013.
BASF Brochure "Oilfield Chemicals Product Range" dated Jul. 2010.
Halliburton Brochure "Micro Matrix®" dated Nov. 2006.
ThermPhos Brochure "Dequest® 2066" printed from the Internet on Nov. 18, 2013.
Benge, O.G. et al., "Evaluation of Blast Furnace Slag Slurried for Oilfield Application" SPE 27449, pp. 169-180, SPE, Inc., 1994.
Halliburton Brochure "Baroid" dated Mar. 25, 2010.
Allahverdi, A. et al., (2006). "Chemical activation and set acceleration of lime-natural pozzolan cement." Ceramics-Silikaty, 193-199.
Brito, A. et al., (2004). "High surface area support, catalyst derived from natural pumice." Study of pretreatment variables. Ind. Eng. Chem. Res., 443, 1659-1664.
Johnson, C.D. et al., (2007). "Zeolitisation of pumice-microporous materials on macroporous support structures derived from natural minerals." J. Mat. Chem., 17, 476-484.
Mielenz, R.C. et al., (1950). "Effect of calcination on natural pozzolans." Symposium on use of pozzolanic materials in mortars and concretes (pp. 43-92). ASTM.
Ottana, R. et al., (1982). "Hydrothermal synthesis of zeolites from pumice in alkaline and saline environment." Zeolites, 2, 295-298.
Palomo, A. et al., (2011). "Alkaline activation, procedure for transforming fly ash into new materials. Part I: Applications." World of Coal Ash (WOCA) Conference (pp. 1-14). Denver, CO:http://www.flyash.info/.
Pisklak, T.J. et al., (2004). "Preparation and characterization of mordenite thin films via pulsed laser deposition." Journal of Porous Materials, 11(4), 191-209.
Rebrov, E.V. et al., (2009). "Sol-gel synthesis of zeolite coatings and their application in catalytic microstructured reactors." Catalysis in Industry, 1(4), 322-347.
Saija, L.M. et al., (1983). "Zeolitization of pumice in ash-sodium salt solutions." Mat. Chem. Phys., 8, 207-216.
Shi, C. (2001). "An overview on the activation reactivity of natural pozzolans." Can J. Civ. Eng., 778-786.
Shvarzman, A. et al., (2001). "Influence of chemical and phase composition of mineral admixtures on their pozzolanic activity." Advances in Cement Research, 13(1), 1-7.
V-Mar 3 Concrete Rheology-Modifying Admixture Product Description available from Grace Construction at http://www.na.graceconstruction.com/ viewed on Oct. 2013.
Southern Clay Products Data Sheet for Laponite RD, available from http://www.rockwoodadditives.com/ and viewed on Oct. 2013.
Daxad 19 MSDS, available from Geo Specialty Chemicals at http://www.geosc.com/ and last revised Sep. 20, 2013.
Liquiment 5581F Product Description available from BASF at http://www.oilfield-solutions.basf.com/ viewed on Oct. 2013.
Ethacryl G Product Description available from Arkema at http://www.arkema.com/ viewed on Oct. 2013.
SA-1015 Suspending Agent Product Description available from Halliburton Energy Services at http://www.halliburton.com/ viewed on Oct. 2013.
WellLife 684 Additive Product Description available from Halliburton Energy Services at http://www.halliburton.com/ viewed on Oct. 2013.
Halad-344 Fluid Loss Additive Product Description available from Halliburton Energy Services at http://www.halliburton.com/ viewed on Oct. 2013.
Canadian Search Report for Application No. 2936003 dated Mar. 21, 2017.
GCC Examination Report for Application No. GC2015-28988 dated Oct. 10, 2017.

* cited by examiner

SETTABLE COMPOSITIONS AND METHODS OF USE

CROSS-REFERENCE TO RELATED APPLICATIONS

The present application is a continuation of U.S. patent application Ser. No. 14/194,125 filed on Feb. 28, 2014 which is a continuation-in-part of U.S. patent application Ser. No. 13/417,001, filed on Mar. 9, 2012, the entire disclosure of which is incorporated herein by reference.

BACKGROUND

Embodiments relate to subterranean operations and, in certain embodiments, to settable compositions and methods of using settable compositions in subterranean formations.

During the drilling of a wellbore in a subterranean formation, a drilling fluid may be used to, among other things, cool the drill bit, lubricate the rotating drill string to prevent it from sticking to the walls of the well bore, prevent blowouts by serving as a hydrostatic head to counteract the sudden entrance into the well bore of high pressure formation fluids, and remove drill cuttings from the well bore. A drilling fluid may be circulated downwardly through a drill pipe and drill bit and then upwardly through the wellbore to the surface. The drilling fluid used may be any number of fluids (gaseous or liquid) and mixtures of fluids and solids (such as solid suspensions, mixtures, and emulsions).

After drilling to a desired depth and prior to and in preparation of the cementing phase, the drill bit may be withdrawn from the wellbore, and circulation of the drilling fluid is stopped. The drilling fluid may be left in the wellbore along with a filter cake of solids from the drilling fluid. Next, a pipe string (e.g., casing, liners, etc.) may be introduced into the well bore. Depending on the depth of the well bore and whether or not any problems are encountered in introducing the pipe string into the well bore, the drilling fluid may remain relatively static in the well bore for a relatively long time period, for example, up to about 2 weeks or longer. While drilling fluids are generally not settable (e.g., they generally do not to form a hardened mass over time), drilling fluids may increase in gel strength over time. Accordingly, during the time period that the drilling fluid is static in the well bore, portions of the drilling fluid may increase in gel strength so that displacement of the drilling fluid from within the well bore may be become more difficult. At a desired time, the pipe string may be cemented in place by pumping a cement composition through the pipe string and into the annulus between the pipe string and the walls of the well bore whereby the drilling fluid in the annulus is displaced therefrom by the cement composition. While a variety of techniques have been developed for improving the displacement of the drilling fluid from the annulus, if the drilling fluid has developed gel strength due to remaining static in the well bore for a long period of time, portions of the drilling fluid in the well bore are bypassed by the cement composition. Since the drilling fluid is not settable, i.e., it does not set into a rigid sealable mass, formation fluids enter and flow in the well bore which is highly undesirable.

In some instances, a settable composition (commonly referred to as a "settable spotting composition") may be used to remove drilling fluid and prevent the drilling fluid filter cake from interfering with subsequent primary cementing operations. These settable spotting compositions may be used to at least partially displacing the drilling fluid before the drilling fluid in the wellbore has had a chance to gain significant gel strength, for example, prior to introducing the pipe string into the well bore. Generally, these settable spotting compositions should not have an undesirable increase in gel strength after being static in the wellbore for a period of time, for example, up to at least two weeks, so that the settable spotting compositions may be displaced from the wellbore. After the wellbore is at least partially filled with the settable spotting composition, the pipe string to be cemented may be introduced into the wellbore. When the cement composition is pumped through the pipe string into the annulus, the drilling fluid (if any) and settable spotting composition in the pipe string and annulus should be displaced ahead of the cement composition. The settable spotting composition, if any, remaining in fractures or other permeable portions of the subterranean formation should set into a hardened mass, thereby preventing or reducing the entry or flow of formation fluids in the annulus.

In alternative operations, commonly referred to as "puddle jobs," a settable composition may be placed into the wellbore before the casing and consequently the settable composition must remain in a fluid puddle state long enough for the casing string to be placed into the wellbore. Once the casing string is successfully positioned the settable composition may then set into a hardened mass, which may be sealable and/or may prevent the migration of fluids in the wellbore.

While settable compositions have been developed heretofore, challenges exist with their successful use in subterranean cementing operations. For example, settable compositions used as settable spotting compositions should ideally remain fluid long enough so that they can ultimately be displaced with the cement composition or any associated spacer fluids. Similarly, settable compositions used in puddle jobs should ideally remain fluid long enough to place and position the casing within the wellbore. Moreover, it may be desirable for the settable compositions to develop a sufficient compressive strength when it is no longer desired for the settable composition to remain fluid.

BRIEF DESCRIPTION OF THE DRAWINGS

These drawings illustrate certain aspects of some of the embodiments of the present method, and should not be used to limit or define the method.

DESCRIPTION OF PREFERRED EMBODIMENTS

Figure 1:
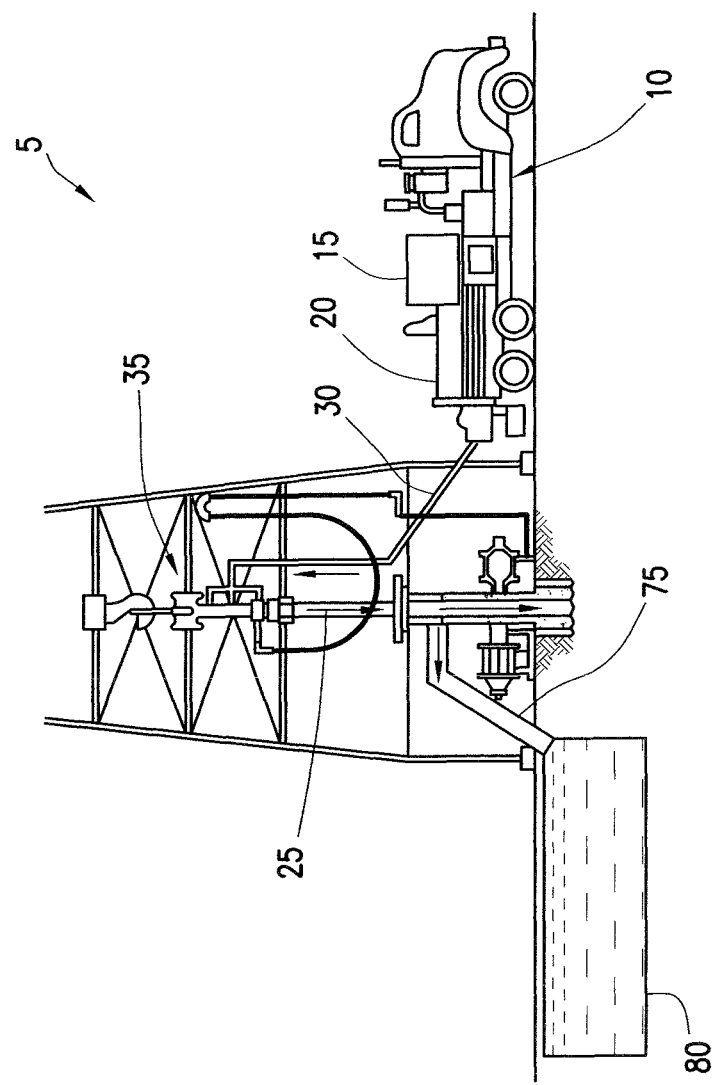
FIG. 1 illustrates surface equipment that may be used in the placement of a settable composition in a wellbore in accordance with certain embodiments.

Embodiments relate to subterranean operations and, in certain embodiments, to settable compositions and methods of using settable compositions in subterranean formations.

Embodiments of the settable compositions may generally comprise water, pumice, hydrated lime, and a set retarder. Optionally, the settable compositions may further comprise a set activator. Advantageously, embodiments of the settable compositions may be capable of remaining in a pumpable fluid state for an extended period of time—even after activation. For example, the settable compositions may remain in a pumpable fluid state for about 1 day, about 3 days, about 5 days, about 7 days, or longer. Moreover, embodiments of the settable composition may maintain low gel strengths for extended periods of time, allowing their displacement after remaining static in the wellbore for a period of time. For example, the settable compositions may have a yield point less than 20 lbs./100 ft.$^2$ and gel-strength development less than about 25 lbs./100 ft.$^2$ for about 1 day, about 3 days, about 5 days, about 7 days, or longer. In addition, the settable composition may have an initial set to 50 psi of about 1 day, about 2 days, about 5 days, or longer. Advantageously, the settable compositions may ultimately develop reasonable compressive strengths after activation at relatively low temperatures. While the settable compositions may be suitable for a number of subterranean operations, they may be particularly suitable operations where it is desired to have an extended set after placement in the subterranean formation, such as settable spotting compositions and puddle jobs. In embodiments, the settable compositions may be used in subterranean formations having pressures up to about 15,000 psi or higher.

The water used in embodiments of the settable compositions may be from any source provided that it does not contain an excess of compounds that may undesirably affect other components in the settable compositions. For example, a settable composition may comprise fresh water or salt water. Salt water generally may include one or more dissolved salts therein and may be saturated or unsaturated as desired for a particular application. Seawater or brines may be suitable for use in embodiments. Further, the water may be present in an amount sufficient to form a pumpable fluid. In certain embodiments, the water may be present in the settable compositions in an amount in the range of from about 33% to about 200% by weight of the pumice. In certain embodiments, the water may be present in the settable compositions in an amount in the range of from about 35% to about 70% by weight of the pumice. One of ordinary skill in the art with the benefit of this disclosure will recognize the appropriate amount of water for a chosen application.

Embodiments of the settable compositions may comprise pumice. Generally, pumice is a volcanic rock that can exhibit cementitious properties in that it may set and harden in the presence of hydrated lime and water. The pumice may also be ground. Generally, the pumice may have any particle size distribution as desired for a particular application. In certain embodiments, the pumice may have a d50 particle size distribution in a range of from about 1 micron to about 200 microns. The d50 values may be measured by particle size analyzers such as those manufactured by Malvern Instruments, Worcestershire, United Kingdom. In specific embodiments, the pumice may have a d50 particle size distribution in a range of from about 1 micron to about 200 microns, from about 5 microns to about 100 microns, or from about 10 microns to about 25 microns. In one particular embodiment, the pumice may have a d50 particle size distribution of about 15 microns or less. An example of a suitable pumice is available from Hess Pumice Products, Inc., Malad, Id., as DS-325 lightweight aggregate, having a d50 particle size distribution of about 15 microns or less. It should be appreciated that particle sizes too small may have mixability problems while particle sizes too large may not be effectively suspended in the compositions. One of ordinary skill in the art, with the benefit of this disclosure, should be able to select a particle size for the pumice suitable for a chosen application.

Embodiments of the settable compositions may comprise hydrated lime. As used herein, the term "hydrated lime" will be understood to mean calcium hydroxide. In some embodiments, the hydrated lime may be provided as quicklime (calcium oxide) which hydrates when mixed with water to form the hydrated lime. The hydrated lime may be included in embodiments of the settable compositions, for example, to form a hydraulic composition with the pumice. For example, the hydrated lime may be included in a pumice-to-hydrated-lime weight ratio of about 10:1 to about 1:1 or about 3:1 to about 5:1. Where present, the hydrated lime may be included in the settable compositions in an amount in the range of from about 10% to about 100% by weight of the pumice, for example. In some embodiments, the hydrated lime may be present in an amount ranging between any of and/or including any of about 10%, about 20%, about 40%, about 60%, about 80%, or about 100% by weight of the pumice. In some embodiments, the settable components present in the settable compositions may consist essentially of the pumice and the hydrated lime. For example, the settable components may primarily comprise the pumice and the hydrated lime without any additional components (e.g., Portland cement, fly ash, slag cement) that hydraulically set in the presence of water. One of ordinary skill in the art, with the benefit of this disclosure, will recognize the appropriate amount of the hydrated lime to include for a chosen application.

Embodiments of the settable compositions may comprise a set retarder. A broad variety of set retarders may be suitable for use in the settable compositions. For example, the set retarder may comprise phosphonic acids, such as amino tris(methylene phosphonic acid), ethylenediamine tetra(methylene phosphonic acid), diethylenetriamine penta(methylene phosphonic acid), etc.; lignosulfonates, such as sodium lignosulfonate, calcium lignosulfonate, etc.; salts such as stannous sulfate, lead acetate, monobasic calcium phosphate, organic acids, such as citric acid, tartaric acid, etc.; cellulose derivatives such as hydroxyl ethyl cellulose (HEC) and carboxymethyl hydroxyethyl cellulose (CM-HEC); synthetic co- or ter-polymers comprising sulfonate and carboxylic acid groups such as sulfonate-functionalized acrylamide-acrylic acid co-polymers; borate compounds such as alkali borates, sodium metaborate, sodium tetraborate, potassium pentaborate; derivatives thereof, or mixtures thereof. Examples of suitable set retarders include, among others, phosphonic acid derivatives. One example of a suitable set retarder is Micro Matrix® cement retarder, available from Halliburton Energy Services, Inc. Generally, the set retarder may be present in the settable compositions in an amount sufficient to delay the setting for a desired time. In some embodiments, the set retarder may be present in the settable compositions in an amount in the range of from about 0.01% to about 10% by weight of the pumice. In specific embodiments, the set retarder may be present in an amount ranging between any of and/or including any of about 0.01%, about 0.1%, about 1%, about 2%, about 4%, about 6%, about 8%, or about 10% by weight of the pumice. Additionally more than one set retarder may be used for a given application, such that any embodiment of the settable compositions may comprise one or more set retarders. One of ordinary skill in the art, with the benefit of this disclosure, will recognize the appropriate amount of set retarder to include for a chosen application.

As previously mentioned, embodiments of the settable compositions may optionally comprise a dispersant. Examples of suitable dispersants include, without limitation, sulfonated-formaldehyde-based dispersants (e.g., sulfonated acetone formaldehyde condensate), examples of which may include Daxad 19 dispersant available from Geo Specialty Chemicals, Ambler, Pa. Other suitable dispersants may be polycarboxylated ether dispersants such as Liquiment® 5581F and Liquiment® 514L dispersants available from BASF Corporation Houston, Tex.; or Ethacryl™ G dispersant available from Coatex, Genay, France. An additional example of a suitable commercially available dispersant is CFR™-3 dispersant, available from Halliburton Energy Services, Inc, Houston, Tex. The Liquiment® 514L dispersant may comprise 36% by weight of the polycarboxylated ether in water. While a variety of dispersants may be used in accordance with embodiments, polycarboxylated ether dispersants may be particularly suitable for use in some embodiments. Without being limited by theory, it is believed that polycarboxylated ether dispersants may synergistically interact with other components of the settable compositions. For example, it is believed that the polycarboxylated ether dispersants may react with certain set retarders (e.g., phosphonic acid derivatives) resulting in formation of a gel that suspends the pumice and hydrated lime in the settable compositions for an extended period of time.

In some embodiments, the dispersant may be included in the settable compositions in an amount in the range of from about 0.01% to about 5% by weight of the pumice. In specific embodiments, the dispersant may be present in an amount ranging between any of and/or including any of about 0.01%, about 0.1%, about 0.5%, about 1%, about 2%, about 3%, about 4%, or about 5% by weight of the pumice. One of ordinary skill in the art, with the benefit of this disclosure, will recognize the appropriate amount of the dispersant to include for a chosen application.

In some embodiments, a viscosifier may be included in the settable compositions. The viscosifier may be included to optimize fluid rheology and to stabilize the suspension. Without limitation, examples of viscosifiers include swellable clays such as bentonite or biopolymers such as cellulose derivatives (e.g., hydroxyethyl cellulose, carboxymethyl cellulose, carboxymethyl hydroxyethyl cellulose). An example of a commercially available viscosifier is SA-1015™ available from Halliburton Energy Services, Inc., Houston, Tex. The viscosifier may be included in the settable compositions in an amount in the range of from about 0.01% to about 0.5% by weight of the pumice. In specific embodiments, the viscosifier may be present in an amount ranging between any of and/or including any of about 0.01%, about 0.05%, about 0.1%, about 0.2%, about 0.3%, about 0.4%, or about 0.5% by weight of the pumice. One of ordinary skill in the art, with the benefit of this disclosure, will recognize the appropriate amount of viscosifier to include for a chosen application.

Embodiments may include the addition of a set activator to the settable compositions. The term "set activator" or "activator", as used herein, refers to an additive that activates a set-delayed or retarded settable composition. A set activator may also accelerate the setting of the set-delayed or retarded settable composition. While embodiments describe inclusion of a set activator, the settable compositions may be activated thermally. In embodiments where the settable compositions are activated thermally, the settable compositions are activated by the heat of the subterranean formation in which they are introduced. In embodiments where the settable compositions are activated by a set activator, the set activator may be added to the settable compositions prior to pumping the settable compositions into the subterranean formation. Whether to activate the settable composition with a set activator or thermally with the heat of the subterranean formation depends on a number of factors, including the downhole temperature and the desire to control slurry rheological and/or strength development properties. At low temperatures, thermal activation is not sufficient to drive hydration in the compositions, and chemical activation is required. However, even at high temperatures, when there is a desire to enhance development of early strength or late strength in the composition, which may, in some embodiments be a function of the slurry's rheology, or when there is a need to suppress, for example, gas/fluid migration, a set activator may allow for control over these properties whereas thermal activation may just initiate hydration and drive the reaction to completion.

Examples of suitable set activators include, but are not limited to: zeolites, amines such as triethanolamine, diethanolamine; silicates such as sodium silicate; zinc formate; calcium acetate; Groups IA and IIA hydroxides such as sodium hydroxide, magnesium hydroxide, and calcium hydroxide; monovalent salts such as sodium chloride; divalent salts such as calcium chloride; nanosilica (i.e., silica having a particle size of less than or equal to about 100 nanometers); polyphosphates; and combinations thereof. In some embodiments, a combination of the polyphosphate and a monovalent salt may be used for activation. The monovalent salt may be any salt that dissociates to form a monovalent cation, such as sodium and potassium salts. Specific examples of suitable monovalent salts include potassium sulfate, and sodium sulfate. A variety of different polyphosphates may be used in combination with the monovalent salt for activation of the settable compositions, including polymeric metaphosphate salts, phosphate salts, and combinations thereof. Specific examples of polymeric metaphosphate salts that may be used include sodium hexametaphosphate, sodium trimetaphosphate, sodium tetrametaphosphate, sodium pentametaphosphate, sodium heptametaphosphate, sodium octametaphosphate, and combinations thereof. A specific example of a suitable set activator comprises a combination of sodium sulfate and sodium hexametaphosphate. In particular embodiments, the activator may be provided and added to the settable compositions as a liquid additive, for example, a liquid additive comprising a monovalent salt, a polyphosphate, and optionally a dispersant. In embodiments, the set activator is typically added to the settable compositions prior to introducing the settable compositions into the subterranean formation and/or wellbore; however, there may be instances where it is necessary to add one or additional set activators to the settable compositions after they have been introduced to the subterranean formation.

Some embodiments may include a set activator comprising a combination of a monovalent salt and a polyphosphate. The monovalent salt and the polyphosphate may be combined prior to their addition to the settable compositions or they may be separately added to the settable compositions. The monovalent salt may be any salt that dissociates to form a monovalent cation, such as sodium and potassium salts. Specific examples of suitable monovalent salts include potassium sulfate and sodium sulfate. A variety of different polyphosphates may be used in combination with the monovalent salt for activation of the settable compositions, including polymeric metaphosphate salts, phosphate salts, and combinations thereof, for example. Specific examples of polymeric metaphosphate salts that may be used include sodium hexametaphosphate, sodium trimetaphosphate, sodium tetrametaphosphate, sodium pentametaphosphate, sodium heptametaphosphate, sodium octametaphosphate, and combinations thereof. A specific example of a suitable set activator comprises a combination of sodium sulfate and sodium hexametaphosphate. Interestingly, sodium hexametaphosphate is also known in the art to be a strong retarder of Portland cements. Because of the unique chemistry of polyphosphates, polyphosphates may be used as a set activator for embodiments of the settable compositions disclosed herein. The ratio of the monovalent salt to the polyphosphate may range, for example, from about 5:1 to about 1:25 or from about 1:1 to about 1:10. Embodiments of the set activator may comprise the monovalent salt and the polyphosphate salt in a ratio (monovalent salt to polyphosphate) ranging between any of and/or including any of about 5:1, 2:1, about 1:1, about 1:2, about 1:5, about 1:10, about 1:20, or about 1:25.

In some embodiments, the combination of the monovalent salt and the polyphosphate may be mixed with a dispersant and water to form a liquid additive for activation of a settable composition. Examples of suitable dispersants include, without limitation, the previously described dispersants, such as sulfonated-formaldehyde-based dispersants and polycarboxylated ether dispersants. One example of a commercial dispersant is CFR3™ dispersant, available from Halliburton Energy Services, Inc. One example of a suitable polycarboxylated ether dispersant is Liquiment® 514L or 5581F dispersants, available from BASF Corporation, Houston, Tex.

The liquid additive may function as a set activator. As discussed above, a set activator may also accelerate the setting of the settable composition. The use of a liquid additive to accelerate a settable composition is dependent upon the compositional makeup of the liquid additive as well as the compositional makeup of the settable compositions. With the benefit of this disclosure, one of ordinary skill in the art should be able to formulate a liquid additive to activate and/or accelerate settable compositions.

The set activator may be included in the settable compositions in an amount sufficient to induce the settable compositions to set into a hardened mass. In certain embodiments, the set activator may be included in the settable compositions in an amount in the range of about 0.1% to about 20% by weight of the pumice. In specific embodiments, the set activator may be present in an amount ranging between any of and/or including any of about 0.1%, about 1%, about 5%, about 10%, about 15%, or about 20% by weight of the pumice. Additionally, more than one set activator may be used, such that a combination of set activators may be provided to the settable compositions. One of ordinary skill in the art, with the benefit of this disclosure, will recognize the appropriate amount of set activator to include for a chosen application.

Other additives suitable for use in subterranean operations also may be included in embodiments of the settable compositions. Examples of such additives include, but are not limited to: weighting agents, lightweight additives, gas-generating additives, mechanical-property-enhancing additives, lost-circulation materials, filtration-control additives, fluid-loss-control additives, defoaming agents, foaming agents, thixotropic additives, and combinations thereof. Examples of suitable weighting agents include, for example, materials having a specific gravity of 3 or greater, such as barite. In embodiments, one or more of these additives may be added to the settable compositions after storing but prior to the placement of the settable compositions into a subterranean formation. A person having ordinary skill in the art, with the benefit of this disclosure, should readily be able to determine the type and amount of additive useful for a particular application and desired result.

Those of ordinary skill in the art will appreciate that embodiments of the settable compositions generally should have a density suitable for a particular application. By way of example, the settable compositions may have a density in the range of from about 4 pounds per gallon ("lb/gal") to about 20 lb/gal. In certain embodiments, the settable compositions may have a density in the range of from about 8 lb/gal to about 17 lb/gal. Embodiments of the settable compositions may be foamed or unfoamed or may comprise other means to reduce their densities, such as hollow microspheres, low-density elastic beads, or other density-reducing additives known in the art. In embodiments, the density may be reduced after storing the composition, but prior to placement in a subterranean formation. Those of ordinary skill in the art, with the benefit of this disclosure, will recognize the appropriate density for a particular application.

The settable composition may be characterized by remaining in a pumpable fluid state for an extended period of time. When used in subterranean operations, the settable compositions may remain in a pumpable fluid state at downhole conditions (even after activation) for a period of time from about 1 day to about 7 days or longer. In some embodiments, the settable compositions may remain in a pumpable fluid state for about 1 day, about 2 days, about 3 days, etc. The settable compositions may be activated thermally or with a set activator. In embodiments where the settable compositions are activated thermally, the settable compositions are activated by the heat of the subterranean formation in which they are introduced. In embodiments where the settable compositions are activated by a set activator, the set activator may be added to the settable compositions prior to pumping the settable compositions into the subterranean formation. The thickening time of the settable compositions refers to the measure of time that a settable composition (e.g., a settable spotting composition) remains in pumpable fluid state. A settable composition is considered to be in a pumpable fluid state where the fluid has a consistency of less than 70 Bearden units of consistency ("Bc"), as measured on a pressurized consistometer in accordance with the procedure for determining cement thickening times set forth in API RP Practice 1 OB-2, *Recommended Practice for Testing Well Cements*, First Edition, July 2005. The thickening times described herein may be for any embodiment of the settable compositions used within temperature ranges of about 140° F. to about 450° F. and for pressures ranging from the ambient pressure of the formation to greater than 15,000 psi.

When desired for use, embodiments of the settable compositions may be activated (e.g., by combination with an activator) to set into a hardened mass. The term "set activator" or "activator", as used herein, refers to an additive that activates a set-delayed or retarded settable composition. A set activator may also accelerate the setting of the set-delayed or retarded settable composition. By way of example, embodiments of the settable compositions may be activated to form a hardened mass in a time period in the range of from about 1 day to about 7 days, or longer. For example, embodiments of the settable compositions may set to form a hardened mass in about 1 day, about 3 days, about 5 days, about 7 days, or longer. The settable compositions may continue to gain compressive strength over time periods exceeding 7 days.

In some embodiments, the settable compositions may set to have a desirable compressive strength after activation. However, the settable compositions should not develop an initial compressive strength of 50 psi for an extended period of time. Compressive strength is generally the capacity of a material or structure to withstand axially directed pushing forces. The compressive strength may be measured at a specified time after the settable composition has been activated and the resultant composition is maintained under specified temperature and pressure conditions. Compressive strength can be measured by either destructive or non-destructive methods. The destructive method physically tests the strength of treatment fluid samples at various points in time by crushing the samples in a compression-testing machine. The compressive strength is calculated from the failure load divided by the cross-sectional area resisting the load and is reported in units of pound-force per square inch (psi). Non-destructive methods may employ a UCA™ ultrasonic cement analyzer, available from Fann Instrument Company, Houston, Tex. Compressive strength values may be determined in accordance with API RP 10B-2, *Recommended Practice for Testing Well Cements*, First Edition, July 2005.

The settable composition may be characterized by having an initial set to 50 psi of about 1 day or longer. For example, the settable composition may not develop 50 psi of compressive strength when allowed to set at downhole conditions for about 1 day or longer. By way of example, the settable composition may not develop 50 psi of compressive strength for about 1 day, about 2 days, about 5 days, or even longer. In some embodiments, the compressive strength values may be determined using destructive or non-destructive methods at a temperature ranging from 100° F. to 200° F.

In some embodiments, a settable composition may be provided that comprises water, pumice, hydrated lime, a set retarder, and optionally a dispersant. The settable composition may be stored, for example, in a vessel or other suitable container. The settable composition may be permitted to remain in storage for a desired time period. For example, the settable composition may remain in storage for a time period of about 1 day or longer. As another example, the settable composition may remain in storage for a time period of about 1 day, about 2 days, about 5 days, about 7 days, about 10 days, about 20 days, about 30 days, about 40 days, about 50 days, about 60 days, or longer. Thereafter, the settable composition may be activated, for example, by the addition of a set activator, introduced into a subterranean formation, and then allowed to set therein.

As will be appreciated by those of ordinary skill in the art, embodiments of the settable compositions may be used in a variety of subterranean operations where it is described for a settable composition to remain pumpable for an extended period of time after placement. For example, the settable compositions may be used as settable spotting compositions and in "puddle jobs." In some embodiments, a settable composition may be provided that comprises water, pumice, hydrated lime, a set retarder, and optionally a set activator. The settable compositions may be introduced into a subterranean formation and allowed to set therein. The properties of the settable composition when allowed to set in the formation may make it particularly suited for use as a settable spotting composition and/or in puddle jobs. For example, the settable composition may remain in a pumpable fluid state for 1 day, 3 days, 5 days, 7 days, or even longer. The settable composition may also not develop a compressive strength after introduction into the subterranean formation for a period of 1 day, 3 days, 5 days, 7 days, or even longer. Moreover, the settable composition may have a gel strength of less than about 25 lbs./100 ft.$^2$ for about 1 day, 3 days, 5 days, 7 days, or even longer and a yield point of less than about 20 lbs./100 ft.$^2$ for about 1 day, 3 days, 5 days, 7 days, or even longer. As used herein, introducing the settable compositions into a subterranean formation includes introduction into any portion of the subterranean formation, including, without limitation, into a wellbore drilled into the subterranean formation, into a near wellbore region surrounding the wellbore, or into both. Embodiments may further include storage of the settable compositions for extended time periods (e.g., about 1 day to about 2 years) and also the activation of the settable compositions by thermal activation or by the addition of a set activator.

In embodiments, the settable composition may be used as a settable spotting composition in the displacement of a drilling fluid from a wellbore. An example method may comprise introducing a settable composition into a wellbore so as to displace at least a portion of a drilling fluid from the wellbore. The settable composition may comprise water, pumice, hydrated lime, a set retarder, and optionally a set activator. The settable composition may be used to displace the drilling fluid from the wellbore before the drilling fluid has undesirably increased in gel strength. It may be desirable, in some embodiments, for the settable composition to displace the drilling fluid from those portions of the wellbore containing fractures, vugs, and other permeable portions of the wellbore. After displacement of the drilling fluid, additional steps may include, but are not limited to, introducing a pipe string into the wellbore, and introducing a cement composition into the wellbore so as to displace at least a portion of the settable from the wellbore. Portions of the settable composition may remain in the wellbore, for example, in fractures or other permeable portions of the subterranean formation. Those of ordinary skill in the art will appreciate that the cement composition also may displace any remaining drilling fluid from the wellbore. After introduction therein, the cement composition should be allowed to set in the wellbore.

In embodiments, the settable composition may be used in puddle jobs. An example method may comprise introducing a settable composition into the wellbore and placing it in a puddle at the bottom of the wellbore or a puddle formed above a plug (e.g., in surface or near surface applications). The settable composition may comprise water, pumice, hydrated lime, a set retarder, and optionally a set activator. The settable compositions may remain in a fluid state in a puddle at the bottom of the wellbore until a conduit is placed into the wellbore and positioned. The settable compositions may then set in the annular space between the conduit and the walls of a wellbore to form an annular sheath of a hardened mass. The hardened mass may form a barrier that prevents the migration of fluids in the wellbore. The settable composition may also, for example, support the conduit in the wellbore.

An embodiment comprises a method for introducing a settable composition into a wellbore, the method comprising: providing a settable composition comprising pumice, hydrated lime, a set retarder, and water; introducing the settable composition into a wellbore; and allowing the settable composition to remain static in the wellbore, wherein the settable composition remains in a pumpable fluid state for a period of about 1 day or longer while static in the wellbore.

An additional embodiment comprises a method for introducing a settable composition into a wellbore, the method comprising: providing a settable composition comprising pumice, hydrated lime, a set retarder, and water; introducing the settable composition into the wellbore such that the settable composition forms a puddle in the bottom of the wellbore; and allowing the settable composition to remain static in the wellbore, wherein the settable composition remains in a pumpable fluid state for a period of about 1 day or longer while static in the wellbore.

An additional embodiment comprises a settable composition system for setting a casing comprising: wellbore casing disposed within a wellbore; a settable composition comprising: water, pumice, hydrated lime, and a set retarder; wherein the settable composition is capable of remaining in a fluid state of less than 70 Bc for a time period of about 5 days or longer after the settable composition is introduced into the wellbore; mixing equipment capable of mixing the settable composition; and pumping equipment capable of pumping the settable composition into the wellbore.

FIG. 1 illustrates surface equipment 5 that may be used in placement of a settable composition in accordance with certain embodiments. It should be noted that while FIG. 1 generally depicts a land-based operation; those skilled in the art will readily recognize that the principles described herein are equally applicable to subsea operations that employ floating or sea-based platforms and rigs, without departing from the scope of the disclosure. As illustrated by FIG. 1, the surface equipment 5 may include a cementing unit 10, which may include one or more cement trucks. The cementing unit 10 may include mixing equipment 15 and pumping equipment 20 as will be apparent to those of ordinary skill in the art. The cementing unit 10 may pump a settable composition 25 (depicted by the arrows) through a feed pipe 30 to a cementing head 35 which conveys the settable composition 25 downhole.

Figure 2A:
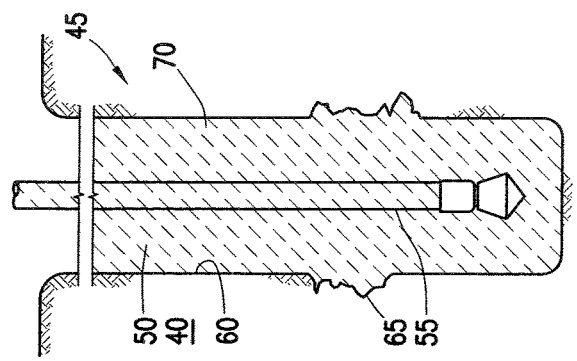
FIG. 2A illustrates a method for placement of a settable composition into a wellbore annulus in accordance with certain embodiments.

An example of using settable composition 25 as a settable spotting composition will now be described with reference to FIGS. 2A-2D. FIG. 2A depicts subterranean formation 40 penetrated by wellbore 45 with drilling fluid 50 disposed therein. While the wellbore 45 is shown extending generally vertically into the subterranean formation 40, the principles described herein are also applicable to wellbores that extend at an angle through the subterranean formation 40, such as horizontal and slanted wellbores. The wellbore 45 may be drilled into the subterranean formation 40 using any suitable drilling technique. As illustrated, the drilling fluid 50 may be introduced into the wellbore 45 through a drill string and bottom hole assembly (BHA) 55. On the walls 60 of the wellbore 45 may be found pockets 65 which may have been created from washouts, fractures, crevices and/or otherwise naturally occurring features of the subterranean formation 40. A settable composition 25 may be run behind the drilling fluid 50, which occupies the lower portion of the drill string and BHA 55.

Figure 2B:
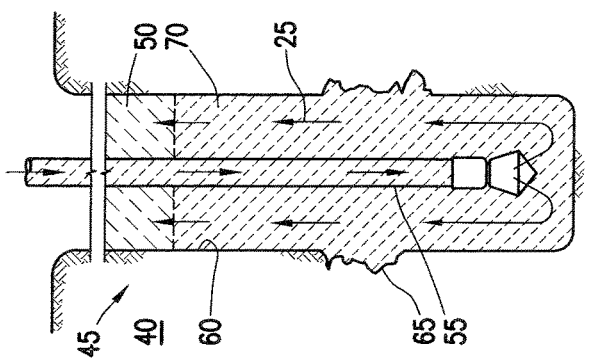
FIG. 2B illustrates a method for the placement of a settable composition into a wellbore annulus in accordance with certain embodiments.

FIG. 2B depicts the subterranean formation 40 with the drill string and BHA 55 still placed downhole, and the settable composition 25 circulated through the drill string and BHA 55 such that it exits the drill string and BHA 55 and travels upward through the annulus 70 between the drill string and BHA 55 and the walls 60 of wellbore 45, thus displacing the drilling fluid 50. At least a portion of the displaced drilling fluid 50 may exit the annulus 70 via a flow line 75 and be deposited, for example, in one or more retention pits 80 (e.g., a mud pit), as shown in FIG. 1. While the settable composition 25 is exiting the drill string and BHA 55 downhole, the drill string and BHA 55 may be circulated and reciprocated in a manner that improves removal of the drilling fluid 50 trapped along the wellbore walls 60 and in the pockets 65.

Figure 2C:
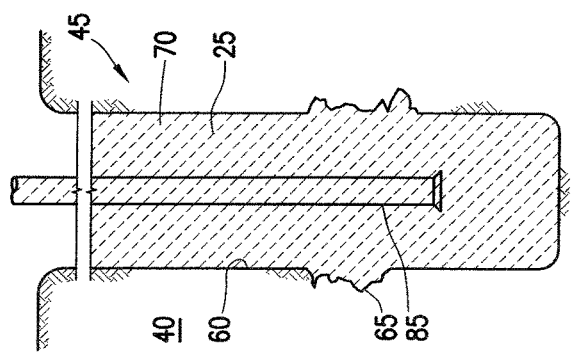
FIG. 2C illustrates a method for the placement of a settable composition into a wellbore annulus in accordance with certain embodiments.
Figure 2D:
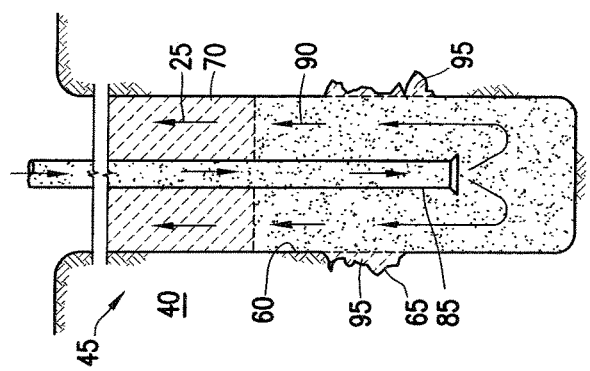
FIG. 2D illustrates a method for the placement of a settable composition into a wellbore annulus in accordance with certain embodiments.

As shown in FIG. 2C, after the drilling fluid 50 may be displaced by the settable composition 25, the drill string and BHA 55 may be removed and a casing string 85 may be placed into the wellbore 45. A cement composition 90 may then be run behind the settable composition 25 in the casing string 85, and, as depicted in FIG. 2D, circulated through the casing string 85 such that it exits the bottom of the casing string 85 and travels upward through the annulus 70 between the casing string 85 and the walls 60 of the wellbore 45 to the predetermined top-of-cement (TOC) depth. In this case, any of the settable composition 25 that is not displaced and remains on the walls 60 of the wellbore 45 and/or in the pockets 65, will, in time, set into a hardened mass 95, therefore precluding the formation of undesirable channels and pathways through which fluids may migrate.

Figure 3:
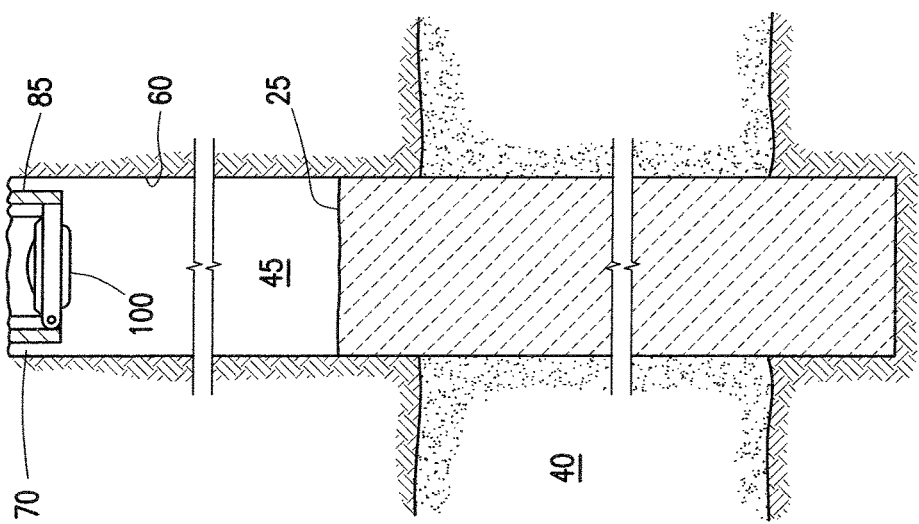
FIG. 3 illustrates a method for the placement of a settable composition into a wellbore in accordance with certain embodiments.

An example of using a settable composition 25 in a "puddle job" operation will now be described with reference to FIGS. 3 and 4. Referring now to FIG. 3, the wellbore 45 is illustrated penetrating subterranean formation 40. A casing string 85 may be run into the wellbore 45 to a depth placing the lower end of the casing string 85 to be cemented above the critical interval through which a cement sheath is desired. Mounted on the lower end of the casing string 85 may be a float valve 100 or any other type of plug (e.g., any sufficient sealing plug and not necessarily a valve). In embodiments, the float valve 100 may be a float valve of any type (e.g., a flapper float valve). The casing string 85 may have centralizers 105 (e.g., as shown on FIG. 4) along its length to keep the casing string 85 away from the walls 60 of the wellbore 45.

The settable composition 25 may be pumped and discharged into the lower end of the wellbore 45. The settable composition 25 may be discharged into the lower end of the wellbore 45 via a drill string and BHA 55 (e.g., as shown in FIGS. 2A-2B) which may be placed into the wellbore 45 prior to positioning the casing string 85 into the wellbore 45. Alternatively, the settable composition 25 may be discharged into the lower end of the wellbore 45 via a drill string and BHA 55 (or other suitable conduit) that is run through the casing string 85 such that the drill string and BHA 55 exits through the lower end of the casing string 85 via the float valve 100. The volume of the settable composition 25 pumped into the wellbore 45 may depend on a number of factors, including the length of the interval needed to be set. For example, the settable composition 25 may remain in a pumpable fluid state (i.e., the settable composition has a consistency of less than 70 Bc) for a period of 1 day, 3 days, 7 day, or longer. In practice, the settable composition 25 should not set in the wellbore 45 until all operations requiring the settable composition 25 to remain in a pumpable fluid state have been completed. It is therefore beneficial to have an accurate estimate of the duration of such operations prior to the formulation of the settable composition 25.

Figure 4:
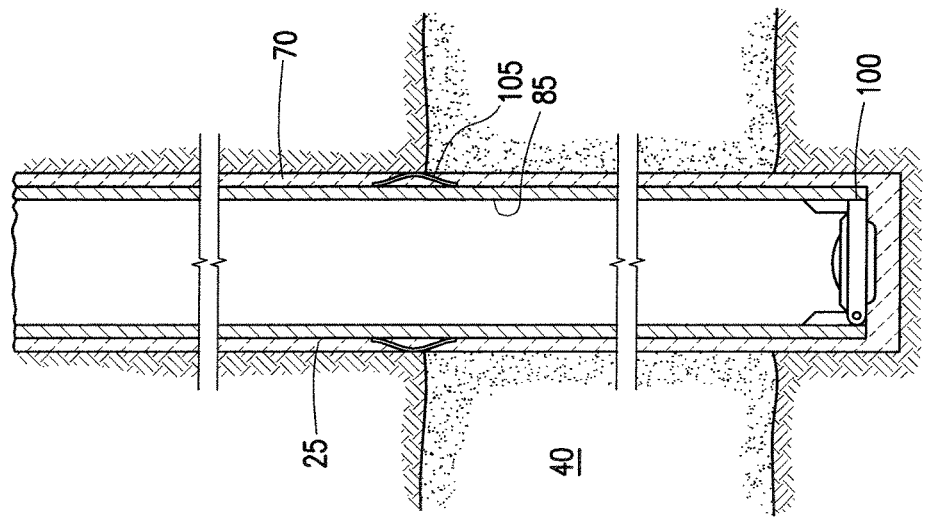
FIG. 4 illustrates the placement of a pipe string into a wellbore annulus at least partially filled with a settable composition in accordance with certain embodiments.

Turning now to FIG. 4, after the desired volume of the settable composition 25 has been discharged into the wellbore 45, the casing string 85 may be lowered to the desired depth within the wellbore 45. As illustrated, the casing string 85 is lowered into settable composition 25 in the lower end of the wellbore 45. The float valve 100 should prevent entry of the settable composition 25 into the casing string 85. As the casing string 85 is lowered into wellbore 45, the settable composition 25 may be displaced from the middle of the wellbore 45 by the casing string 85 with the annulus 70 surrounding the casing string 85 containing the settable composition 25. The settable composition 25 may be forced up the annulus 70 causing the settable composition 25, for example, to displace any other fluids (e.g., drilling fluid 50 (not shown) and/or other fluids such as spacer fluids, displacement fluids, cleaning fluids, and the like) that may have remained in the wellbore 45. The casing string 85 may then be suspended in the wellbore 45 until the settable composition 25 disposed in the annulus 70 has set.

The exemplary settable compositions disclosed herein may directly or indirectly affect one or more components or pieces of equipment associated with the preparation, delivery, recapture, recycling, reuse, and/or disposal of the disclosed settable compositions. For example, the disclosed settable compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary settable compositions. The disclosed settable compositions may also directly or indirectly affect any transport or delivery equipment used to convey the settable compositions to a well site or downhole such as, for example, any transport vessels, conduits, pipelines, trucks, tubulars, and/or pipes used to compositionally move the settable compositions from one location to another, any pumps, compressors, or motors (e.g., topside or downhole) used to drive the settable compositions into motion, any valves or related joints used to regulate the pressure or flow rate of the settable compositions, and any sensors (i.e., pressure and temperature), gauges, and/or combinations thereof, and the like. The disclosed settable compositions may also directly or indirectly affect the various downhole equipment and tools that may come into contact with the settable compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

To facilitate a better understanding of the present embodiments, the following examples of certain aspects of some embodiments are given. In no way should the following examples be read to limit, or define, the entire scope of the embodiments.

EXAMPLES

Example 1

The following example describes a settable composition comprising the following components:

TABLE 1

Compositional Makeup of Sample I

| Component | Amount | Unit* |
|---|---|---|
| Water | 60 | % bwoP |
| Pumice | 100 | % bwoP |
| Lime | 20 | % bwoP |
| Weighting Agent | 2 | % bwoP |
| Retarder | 0.06 | Gal/sk |
| Co-Retarder | 0.5 | % bwoP |
| Dispersant | 0.6 | % bwoP |
| Viscosifier | 0.035 | % bwoP |
| Accelerator | 2 | % bwoP |

*% bwoP = by weight of pumice; Gal/sk = gallons per 46 lb. sack of pumice

The weighting agent was Micromax® FF weight additive available from Halliburton Energy Services, Inc., Houston, Tex. The cement retarder was Micro Matrix® Cement Retarder available from Halliburton Energy Services, Inc., Houston, Tex. The co-retarder was HR®-5 available from Halliburton Energy Services, Inc., Houston, Tex. The dispersant was Liquiment 5581F dispersant available from BASF, Florham Park, N.J. The viscosifier was SA-1015™ suspending agent available from Halliburton Energy Services, Inc., Houston, Tex. The accelerator was an aqueous solution of sodium hexametaphosphate (SHMP) and sodium sulfate in a 1:1 ratio (6% activity). After preparation, the compressive strength of the sample was measured using a UCA maintained at 3,000 psi and 80° F. and with a 10 minute ramp time in accordance with API RP Practice 10B-2, *Recommended Practice for Testing Well Cements*. The UCA test ran for 17 days. At the conclusion of the UCA test, the destructive compressive strength was measured by using a mechanical press to crush the samples in accordance with the procedure set forth in API RP Practice 10B-2, *Recommended Practice for Testing Well Cements*. The rush strength was measured as 473.7 psi. The results of the UCA compressive strength testing are presented in Table 2 below.

TABLE 2

UCA Compressive Strength

| Events | Time (hh:mm) | Time (dd:hh) |
|---|---|---|
| 50 psi | 121:35 | 5:01 |
| 100 psi | 173:44 | 7:06 |
| 250 psi | 280:55 | 11:17 |
| 500 psi | 411:12 | 17:03 |

The composition did not gain compressive strength for approximately 60 hours. Sample I reached initial set after 121 hours and achieved a compressive strength of 500 psi in over 411 hours. This indicates that the composition remained in a fluid state for at least 60 hours and did not reach a reasonable compressive strength until after 121 hours. The composition continued to gain compressive strength until the text was terminated. In addition this sample was subjected to a static gel strength analysis in accordance with the procedure set forth in API RP-10b-6/ISO10426-6, *Recommended Practice on Determining the Static Gel Strength of Cement Formulations* at 80° F., 3000 psi, which are the same parameters as the UCA analysis. The sample exhibited zero gel time of greater than 13 days.

Example 2

In order to optimize the composition at higher temperatures, Samples II-VI were prepared and subjected to thickening time (pump time) tests on a high-pressure high-temperature consistometer. The compositional makeup of Samples II-VI are presented in Table 3 below.

TABLE 3

Compositional Makeup of Samples II-VI

| Component | Unit* | Sample II Amount | Sample III Amount | Sample IV Amount | Sample V Amount | Sample VI Amount |
|---|---|---|---|---|---|---|
| Water | % bwoP | 60 | 60 | 60 | 60 | 60 |
| Pumice | % bwoP | 100 | 100 | 100 | 100 | 100 |
| Lime | % bwoP | 20 | 20 | 20 | 20 | 20 |
| Weighting Agent | % bwoP | 2 | 2 | 2 | 2 | 2 |
| Retarder | Gal/sk | 0.06 | 0.06 | 0.06 | 0.06 | 0.06 |
| Co-Retarder | % bwoP | 0.5 | 0.5 | 0.5 | 0.5 | 0.5 |
| Dispersant | % bwoP | 0.6 | 0.6 | 0.6 | 0.6 | 0.6 |
| Viscosifier | % bwoP | 0.035 | 0.035 | 0.035 | 0.035 | 0.035 |
| Accelerator | % bwoP | 10 | 5 | 2.5 | 1 | 0.5 |

*% bwoP = by weight of pumice; Gal/sk = gallons per 46 lb. sack of pumice

The weighting agent was Micromax® FF weight additive available from Halliburton Energy Services, Inc., Houston, Tex. The cement retarder was Micro Matrix® Cement Retarder available from Halliburton Energy Services, Inc., Houston, Tex. The co-retarder was HR®-5 available from Halliburton Energy Services, Inc., Houston, Tex. The dispersant was Liquiment 5581F dispersant available from BASF, Florham Park, N.J. The viscosifier was SA-1015™ suspending agent available from Halliburton Energy Services, Inc., Houston, Tex. The accelerator was an $CaCl_2$.

The thickening time, heat of hydration, and compressive strength were determined in accordance with API RP Practice 10B-2, *Recommended Practice for Testing Well Cements*. After preparation, the thickening time was measured using a high-pressure high-temperature consistometer in accordance with API RP Practice 10B-2, *Recommended Practice for Testing Well Cements* with the experimental conditions set to 3,000 psi and 140° F., and having a ramp tome of 28 minutes. The heat of hydration, or the time at which the heat of hydration occurs, was determined through inspection of the thickening time test chart. The heat of hydration is identified by an event which causes the sample temperature to overtake the wall temperature which is the heat supplied by the test equipment. The samples were poured into 2 inch by 4 inch brass cylinders and cured in a water batch at 140° F. at atmospheric pressure. Then the destructive compressive strength was measured by using a mechanical press to crush the samples in accordance with the procedure set forth in API RP Practice 10B-2, *Recommended Practice for Testing Well Cements*. The results of these tests are set forth in Table 4 below.

TABLE 4

Thickening Time Results

| Sample | Accelerator % bwoP | 70 BC Thickening Time (hours) | Heat of Hydration (hours) | 7 Day Compressive Strength (hours) |
|---|---|---|---|---|
| II | 10.0 | 12 | 18 | 1943 |
| III | 5.0 | 16 | 19 | 3073 |
| IV | 2.5 | 23 | 28 | 3812 |
| V | 1.0 | 38 | 43 | DNS* |
| VI | 0.5 | 50 | 66 | DNS* |

*DNS = Did not set.

The results indicate that control over the pump time may be achieved by regulating the amount of accelerator formulated with the slurry. Additionally, it was discovered that the heat of hydration point followed a similar trend as the pump time with respect to the accelerator concentration such that the heat of hydration may serve as an indicator that the settable composition was undergoing hydration to set.

Example 3

Sample VII was prepared to build off the favorable results of Sample IV. Sample VII was prepared using additional retarder and dispersant. The compositional makeup of Sample VII is presented in Table 5 below.

TABLE 5

Compositional Makeup of Sample VII

| Component | Amount | Unit* |
|---|---|---|
| Water | 60 | % bwoP |
| Pumice | 100 | % bwoP |
| Lime | 20 | % bwoP |
| Weighting Agent | 2 | % bwoP |
| Retarder | 0.093 | Gal/sk |
| Co-Retarder | 0.5 | % bwoP |
| Dispersant | 1.35 | % bwoP |
| Viscosifier | 0.035 | % bwoP |
| Accelerator | 2 | % bwoP |

*% bwoP = by weight of pumice; Gal/sk = gallons per 46 lb. sack of pumice

The weighting agent was Micromax® FF weight additive available from Halliburton Energy Services, Inc. Houston, Tex. The cement retarder was Micro Matrix® Cement Retarder available from Halliburton Energy Services, Inc., Houston, Tex. The co-retarder was HR®-5 available from Halliburton Energy Services, Inc., Houston, Tex. The dispersant was Liquiment 5581F dispersant available from BASF, Florham Park, N.J. The viscosifier was SA-1015™ suspending agent available from Halliburton Energy Services, Inc., Houston, Tex. The accelerator was $CaCl_2$.

The thickening time, heat of hydration, and compressive strength were determined in accordance with API RP Practice 10B-2, *Recommended Practice for Testing Well Cements*. The thickening time test was conducted at 140° F. and 3000 psi. The samples were poured into 2 inch by 4 inch brass cylinders and cured in a water batch at 140° F. at atmospheric pressure for 7 days. Additionally, the samples were poured into 1 inch by 2 inch brass cylinders and cured in a water batch at 140° F. at 3000 psi for 7 days. After curing, the destructive compressive strength was measured by using a mechanical press to crush the samples in accordance with the procedure set forth in API RP Practice 10B-2, *Recommended Practice for Testing Well Cements*. Then the destructive compressive strength was measured by using a mechanical press to crush the samples in accordance with the procedure set forth in API RP Practice 10B-2, *Recommended Practice for Testing Well Cements*. The results of this test are set forth in Table 6 below.

TABLE 6

Thickening Time Results

| 70 BC Thickening Time (hours) | Heat of Hydration (hours) | 7 Day Compressive Strength (140° F., atmospheric pressure) | 7 Day Compressive Strength (140° F., 3000 psi) |
|---|---|---|---|
| 46 | 64 | 497 | 2190 |

Example 4

Samples VIII-XVI were prepared to test the settable compositions under the high-temperature, high-pressure conditions of 350° F. and 15,000 psi using a high-temperature high-pressure consistometer. The compositional makeup of Samples VIII-XVI are presented in Table 7 below.

TABLE 7

Compositional Makeup of Samples II-VI

| Component* | Sample VIII Amount | Sample IX Amount | Sample X Amount | Sample XI Amount | Sample XII Amount | Sample XIII Amount | Sample XIV Amount | Sample XV Amount | Sample XVI Amount |
|---|---|---|---|---|---|---|---|---|---|
| Water | 60 | 60 | 60 | 60 | 60 | 60 | 60 | 60 | 60 |
| Pumice | 100 | 100 | 100 | 100 | 100 | 100 | 100 | 100 | 100 |
| Lime | 20 | 20 | 20 | 20 | 20 | 20 | 20 | 20 | 20 |
| Weighting Agent | 2 | 2 | 2 | 2 | 2 | 2 | 2 | 2 | 2 |
| Retarder | 0.06 | 0.09 | 0.12 | 0.18 | 0.24 | 0.30 | 0.48 | 0.72 | 1.2 |
| Co-Retarder | 0.5 | 0.5 | 0.5 | 0.5 | 0.5 | 0.5 | 0.5 | 0.5 | 0.5 |
| Dispersant | 0.6 | 0.6 | 0.6 | 0.6 | 0.6 | 0.6 | 0.6 | 0.6 | 0.6 |
| Viscosifier | 0.035 | 0.035 | 0.035 | 0.035 | 0.035 | 0.035 | 0.035 | 0.035 | 0.035 |

*All units are % bwoP (by weight of pumice) except for the Retarder which is Gal/sk = gallons per 46 lb. sack of pumice The weighting agent was Micromax® FF weight additive available from Halliburton Energy Services, Inc., Houston, Tex. The cement retarder was Micro Matrix® Cement Retarder available from Halliburton Energy Services, Inc., Houston, Tex. The co-retarder was HR®-5 available from Halliburton Energy Services, Inc., Houston, Tex. The dispersant was Liquiment 5581F dispersant available from BASF, Florham Park, N.J. The viscosifier was SA-1015™ suspending agent available from Halliburton Energy Services, Inc., Houston, Tex.

The thickening time and the heat of hydration were determined using a high-temperature high-pressure consistometer in accordance with API RP Practice 10B-2, *Recommended Practice for Testing Well Cements*. The test was conducted at 350° F. and 15,000 psi with a 28 minute ramp time. The heat of hydration was determined through inspection of the thickening time test chart. The results of this test are set forth in Table 8 below.

TABLE 8

Thickening Time Results

| Sample | Retarder Gal/sk | 70 BC Thickening Time (hours) | Heat of Hydration (hours) |
|---|---|---|---|
| VIII | 0.06 | 1 | 1.5 |
| IX | 0.09 | 2.5 | 2.75 |
| X | 0.12 | 6 | 6.75 |
| XI | 0.18 | 12 | 12.75 |
| XII | 0.24 | 17.5 | 19 |
| XIII | 0.3 | 20.5 | 22.25 |
| XIV | 0.48 | 25 | 38.5 |
| XV | 0.72 | 37.75 | 51.75 |
| XVI | 1.2 | 61 | 61 |

As indicated in Table 7, the retarder concentration was steadily increased from Sample VIII to XVI. The results indicate a linear relationship between pump time and retarder concentration. With 1.2 Gal/sk retarder, the pump time was delayed to be greater than 60 hours with the heat of hydration also indicating setting at greater than 60 hours. Therefore, even in high-temperature, high-pressure environments, the settable compositions still exhibit delayed-set properties.

Additionally, settable compositions with retarder concentrations of 0.12 gal/sk or greater also exhibit "right-angle" set behavior such that the set profile rapidly increases towards 70 Bc. Effectively Samples X-XVI showed right-angle sets, while Samples VIII and IX did not. Settable compositions with retarder concentrations less than 0.12 gal/sk had set profiles which showed a gradual increase towards 70 Bc, which is indicative of gelation. Therefore, some formulations of the settable compositions may also mitigate gelation and provide a settable composition that remains fluid for an extended period of time up until a specific point in which it undergoes an immediate set. FIG.

Figure 5A:
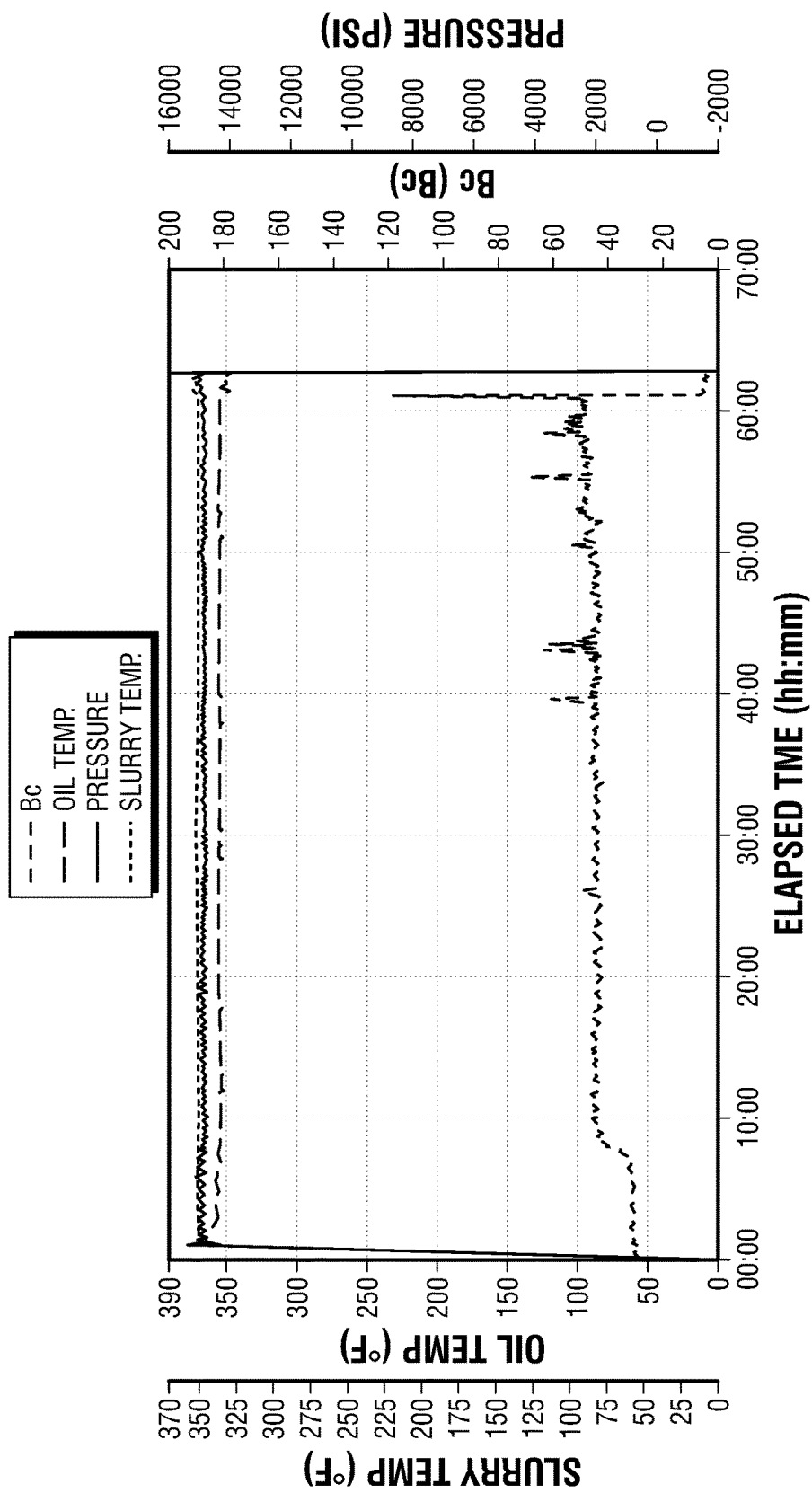
FIG. 5A illustrates a "right-angle" set profile of a settable composition in accordance with certain embodiments.
Figure 5B:
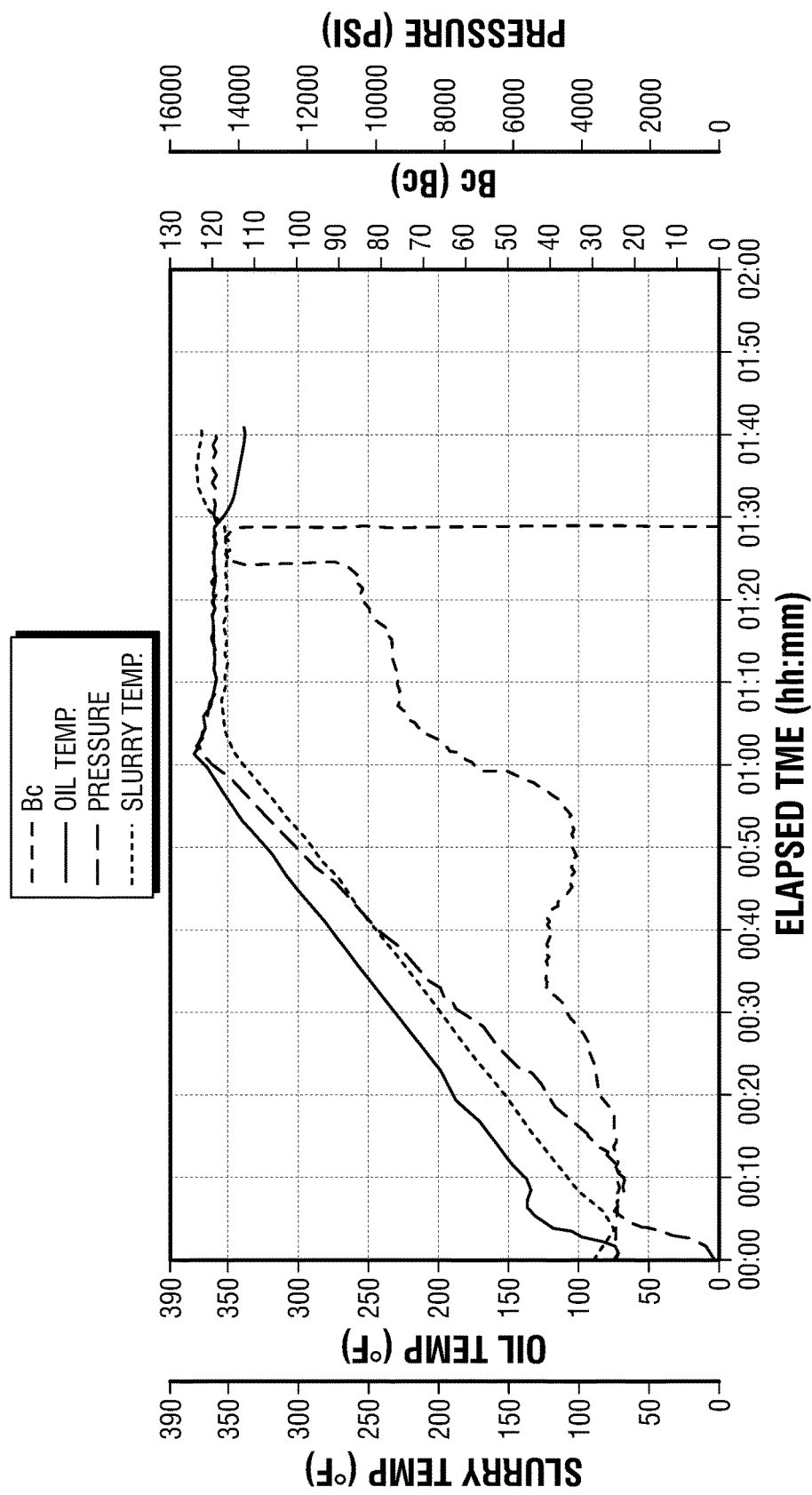
FIG. 5B illustrates a gelation set profile of a settable composition in accordance with certain embodiments.

5A provides an example of "right-angle" set profile using Sample XVI as an example. FIG. 5B provides an example of gelation set profile using Sample VIII as an example.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method for introducing a settable composition into a wellbore, the method comprising:
   providing a settable composition comprising pumice, hydrated lime, a set retarder, and water, wherein the pumice, hydrated lime, and set retarder form a suspension in the water;
   introducing the settable composition into a wellbore; and
   allowing the settable composition to remain static in the wellbore, wherein the settable composition remains in a pumpable fluid state for a period of 1 day or longer while static in the wellbore;
   wherein the settable composition is activated thermally in the wellbore.

2. The method of claim 1 wherein the introducing the settable composition into the wellbore displaces at least a portion of a drilling fluid from a subterranean formation.

3. The method of claim 2 further comprising:
   introducing a cement composition into the wellbore so as to at least partially displace the settable composition from the subterranean formation; wherein a portion of the settable composition remains in the wellbore;
   allowing the cement composition to set in the wellbore; and
   allowing the portion of the settable composition remaining in the wellbore to set.

4. The method of claim 1, wherein the settable composition is introduced into the wellbore such that the settable composition forms a puddle in the bottom of the wellbore, and wherein the method further comprises:
   placing a conduit into the puddle formed by the settable composition in the bottom of the wellbore; and
   allowing the settable composition to set in an annulus surrounding the conduit.

5. The method of claim 1 wherein the set retarder comprises at least one retarder selected from the group consisting of a phosphonic acid, a phosphonic acid derivative, a lignosulfonate, a salt, an organic acid, a carboxymethylated hydroxyethylated cellulose, a synthetic co- or ter-polymer comprising sulfonate and carboxylic acid groups, and a borate compound.

6. The method of claim 5 wherein the settable composition comprises an additional set retarder that is distinct from the set retarder.

7. The method of claim 1 wherein the settable composition further comprises a dispersant.

8. The method of claim 7 wherein the dispersant comprises at least one dispersant selected from the group consisting of a sulfonated-formaldehyde-based dispersant, a polycarboxylated ether dispersant, and any combination thereof.

9. The method of claim 1 wherein the settable composition has a compressive strength of less than about 50 psi and a yield point of less than about 20 lbs./ft.$^2$ after remaining static in the wellbore for a period of 1 day or longer.

10. The method of claim 1 where the settable composition further comprises at least one set activator selected from the group consisting of zeolites, amines, silicates, Groups IA and IIA hydroxides, monovalent salts, divalent salts, nano-silica, polyphosphates, and any combinations thereof.

11. The method of claim 1 wherein the settable composition remains in a fluid state of less than 70 Bc for a time period of 5 days or longer while static in the wellbore.

12. A method for introducing a settable composition into a wellbore, the method comprising:
   providing a settable composition comprising pumice, hydrated lime, a set retarder comprising a phosphonic acid derivative, a polycarboxylated ether dispersant, and water;
   introducing the settable composition into a wellbore;
   allowing the settable composition to remain static in the wellbore, wherein the settable composition remains in a pumpable fluid state for a period of 1 day or longer while static in the wellbore; and
   allowing the settable composition to thermally activate and set in the wellbore.

13. The method of claim 12 wherein the settable composition remains in a fluid state of less than 70 Bc for a time period of 5 days or longer while static in the wellbore.

14. The method of claim 12 wherein the settable composition has a compressive strength of less than about 50 psi and a yield point of less than about 20 lbs./ft.² after remaining static in the wellbore for a period of 1 day or longer.

15. A method for introducing a settable composition into a wellbore, the method comprising:
provided a settable composition comprising pumice, hydrated lime, a set retarder, and water; wherein the pumice, hydrated lime, and set retarder form a suspension in the water;
introducing the settable composition into the wellbore such that the settable composition forms a puddle in the bottom of the wellbore;
allowing the settable composition to remain static in the wellbore, wherein the settable composition remains in a pumpable fluid state for a period of 1 day or longer while static in the wellbore; and
allowing the settable composition to thermally activate and set in the wellbore.

16. The method of claim 15 further comprising placing a conduit into the puddle formed by the settable composition in the bottom of the wellbore; and allowing at least a portion of the settable composition to set in an annulus surrounding the conduit.

17. The method of claim 15 wherein the set retarder comprises at least one retarder selected from the group consisting of a phosphonic acid, a phosphonic acid derivative, a lignosulfonate, a salt, an organic acid, a carboxymethylated hydroxyethylated cellulose, a synthetic co- or ter-polymer comprising sulfonate and carboxylic acid groups, and a borate compound.

18. The method of claim 15 wherein the settable composition further comprises at least one set activator selected from the group consisting of zeolites, amines, silicates, Groups IA and IIA hydroxides, monovalent salts, divalent salts, and nanosilica, polyphosphates.

19. The method of claim 15 wherein the settable composition remains in a fluid state of less than 70 Bc for a time period of 5 days or longer while static in the wellbore.

20. The method of claim 15 wherein the settable composition has a compressive strength of less than about 50 psi and a yield point of less than about 20 lbs./ft.² after remaining static in the wellbore for a period of 1 day or longer.

* * * * *